US005860341A

United States Patent [19]

Visigalli

[11] Patent Number: 5,860,341
[45] Date of Patent: Jan. 19, 1999

[54] SELF-CENTERING STEADY WITH RETRACTABLE GRIPPING ARMS

[75] Inventor: Bruno Visigalli, Castelleone, Italy

[73] Assignee: Morari Giuseppe e Marilena S.n.c., Castelleone, Italy

[21] Appl. No.: 820,130

[22] Filed: Mar. 19, 1997

[30] Foreign Application Priority Data

Mar. 19, 1996 [IT] Italy .................................. MI96U0204

[51] Int. Cl.$^6$ ............................................... B23B 13/12
[52] U.S. Cl. ............................... 82/164; 82/162; 82/170; 279/133
[58] Field of Search ............................. 82/164, 162, 157, 82/170, 173; 279/133

[56] References Cited

U.S. PATENT DOCUMENTS

| 3,320,839 | 5/1967 | Dinsmore | 82/164 X |
| 4,754,673 | 7/1988 | Hiestand | 82/164 |
| 5,058,468 | 10/1991 | Lessway | 82/164 X |
| 5,222,421 | 6/1993 | Ushiro | 82/164 |
| 5,481,951 | 1/1996 | Kiefer | 82/162 |

FOREIGN PATENT DOCUMENTS 35 43 806  6/1987  Germany .
295 10 543  9/1995  Germany .

OTHER PUBLICATIONS

English language abstract of Japanese Patent 61–159343, Jul. 1986.

*Primary Examiner*—Andrea L. Pitts
*Assistant Examiner*—Henry W. H. Tsai
*Attorney, Agent, or Firm*—Wenderoth, Lind & Ponack, L.L.P.

[57] ABSTRACT

A self-centering steady of the closed type includes a housing (H), an actuator (14), a center gripping arm (11) and a pair of side gripping arms (12, 13) intended to grip a workpiece (P) under the action of the actuator (14). The actuator is provided with cam surfaces (31, 32) for engaging the side gripping arms (12, 13) in order to cause the workpiece engagement and/or disengagement movements. Each side gripping arm (12, 13) is connected to the actuator (14) and is slidably received in a rotating element (26) provided in the steady housing (H). The center gripping arm (11) is slidably received in a slide guide (G) provided in the steady housing (H). The rotating elements (26) together with the side gripping arms (12, 13) and with the center gripping arm (11) form a closed structure which prevents dust and scraps from entering the steady housing (H), both with the gripping arms (11, 12, 13) in the retracted and in the extended positions.

7 Claims, 7 Drawing Sheets

FIG. I

SELF-CENTERING STEADY WITH RETRACTABLE GRIPPING ARMS

BACKGROUND OF THE INVENTION

This invention generally relates to steadies for machine tools and, more particularly, to a steady of the self-centering type provided with retractile gripping arms.

DESCRIPTION OF THE PRIOR ART

According to the prior art, some of the self-centering steadies for machine tools generally are of the open type in which a center arm, on which an actuating force is applied, and two side arms, adapted to support the workpiece together with the center arm, are arranged spaced apart by 1200 in order to support the workpiece in three equally spaced points and to center it relative to the center of rotation of the chuck of a lathe.

Because of the necessity to automatize the working cycles, these conventional self-centering steadies have proven to be inadequate because their major disadvantage is attributed to the reduction of the space available for the loading operation of the workpiece.

A proposed solution for overcoming this disadvantage is to provide self-centering steadies of the open type on movable devices or supports which allow their displacement from a working zone to a disengagement zone in order to clear the required operative space. Even though a solution of this kind resolves this problem, it results in high manufacturing costs and is affected by disadvantages both from the control and the operational point of view, thus requiring for its application, an amount of space which is not always available.

Another solution consists of providing the self-centering steadies of the open type with gripping arms which open in an asymmetrical manner in order to facilitate the loading of the workpiece on the steady. However, this does not permit a satisfactory reduction of the overall dimensions, and thus of the risk of dangerous collisions between different portions of the machine tool.

According to other conventional steadies, the gripping arms are received within a housing and when they have to grip a workpiece, the gripping arms are extended outwardly of the housing. These conventional steadies can be referred to as "closed type" steadies.

Also the steadies of the closed type are affected by disadvantages. As a matter of fact, the housing thereof does not offer any protection against dust and scraps which may penetrate the housing when the gripping arms are retracted into the housing, and particularly when they are in an extended condition. This drawback will jeopardize the operation of the steadies of this type and their use on the machine tools.

This invention has, as an object, overcoming the disadvantages of the prior art devices by providing a self-centering steady having a very compact construction which permits the workpiece to be loaded without interfering with other portions of the machine tool while preventing dust or scraps from entering the steady housing with the gripping arms both in the retracted and in extended positions.

SUMMARY OF THE INVENTION

More particularly, the self-centering steady of this invention is of the closed type. The steady comprises a housing, an actuator, a center gripping arm and a pair of side gripping arms intended to grip by rotation a workpiece under the action of the actuator and in which the center gripping arm is adapted to be translated in and out of the steady housing. The pair of side gripping arms are adapted to be rectilinearly translated in and out of the steady housing and to be rotated or pivoted during the workpiece engagement and disengagement movements. The actuator acts directly on the center arm and is provided with cam surfaces intended to engage the side gripping arms in order to cause the workpiece engagement and/or disengagement movement. In the present invention:

each of the side gripping arms is indirectly connected to the actuator;

each of the side gripping arms is slidably received in a rotating element provided in the steady housing near the end of the steady housing from which the gripping arms extend;

the center gripping arm is slidably received in a slide guide provided in the steady housing; and the rotating elements, in combination with the side gripping arms, slidably received therein and together with the center gripping arm form, in the housing, a closed structure which prevents dust and scraps from entering the steady housing, both with the gripping arms in the retracted and in the extended positions.

According to a feature of the present invention, the rotating elements, which slidably receive the side gripping arms, are provided with abutment edges intended to cooperate with stops provided on each of the side gripping arms in order to stop the translation movement of the side gripping arms and start the workpiece engagement movement thereof caused by the respective cam surface of the actuator.

According to another feature of the present invention, spring means are provided for effecting the workpiece disengagement movement and the retraction movement of all of the gripping arms. The spring means is loaded during the workpiece engagement movement of the gripping arms.

According to still another feature of the present invention, each of the side gripping arms is pivotally connected to the actuator by the intermediary of a bracket element.

According to a further feature of the present invention, the bracket elements are slidably received in a shaped guide having a straight portion and a curved portion. The straight portion is intended to transmit to the gripping arms rectilinear extension and retraction movements imparted by the actuator. The curved portion is intended to transmit to the side gripping arms the workpiece engagement and disengagement movements imparted by the cam surfaces of the actuator.

DESCRIPTION OF THE PREFERRED EMBODIMENTS

Figure 1:
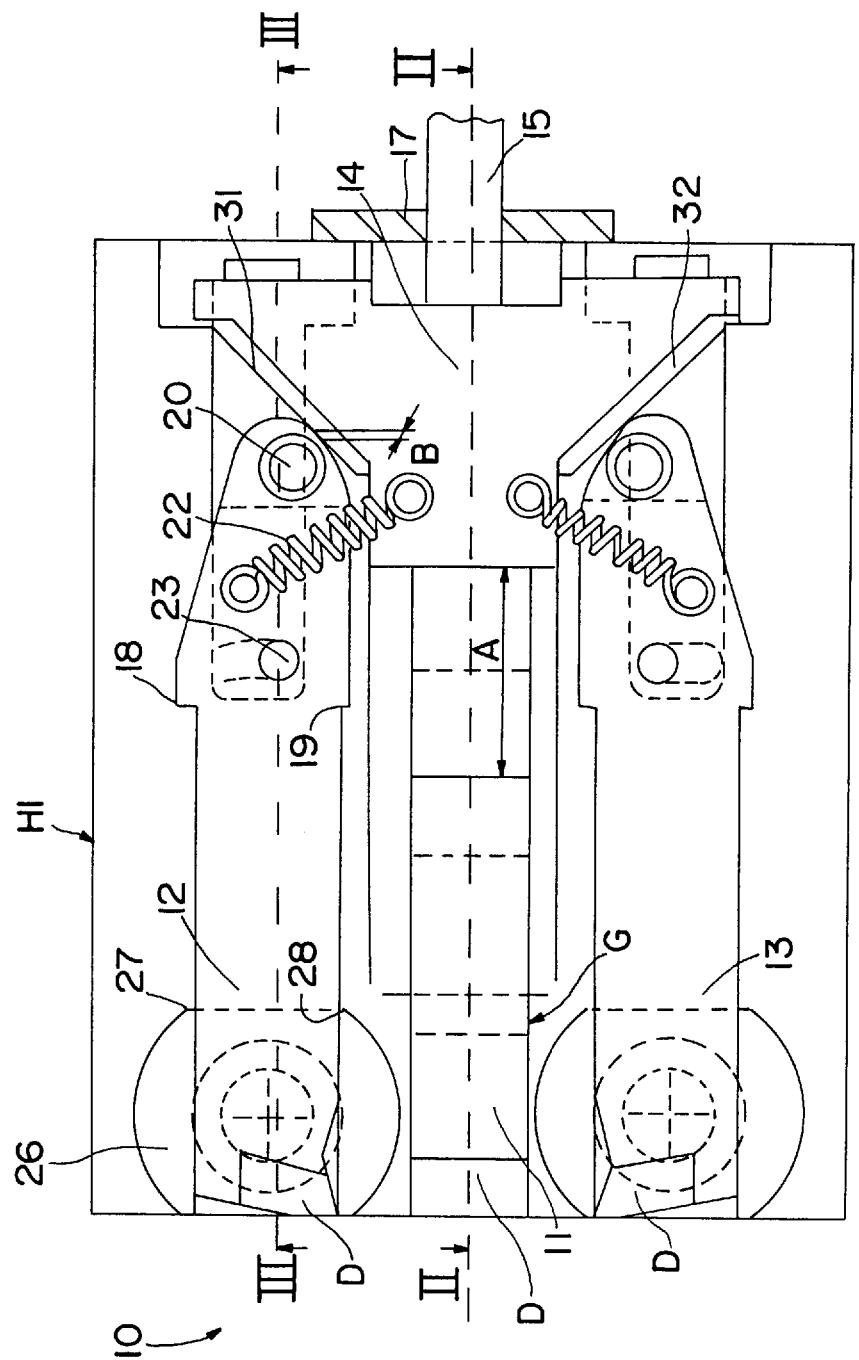
FIG. 1 is an elevational view of the internal structure of a first embodiment of the self-centering steady with its gripping arms in a withdrawn condition.

Referring now to FIG. 1, the first embodiment of the self-centering steady according to the invention, generally indicated with reference numeral 10, comprises a housing H formed of a base plate H1 and a cover plate H2. Three gripping arms, i.e. a center arm 11 and two side arms 12 and 13 are actuated by way of an actuator 14. The rectilinear translation movement of the actuator 14 can be effected by pneumatic, hydraulic or electric means (not shown) through a driving rod 15. The three gripping arms are provided at their free ends with contact pads D.

Since the self-centering steady 10 shows mirror symmetry on either side of its longitudinal axis, the following description of the manner in which it is arranged and operated relates only to the center arm 11 and to the side arm 12.

Figure 2:
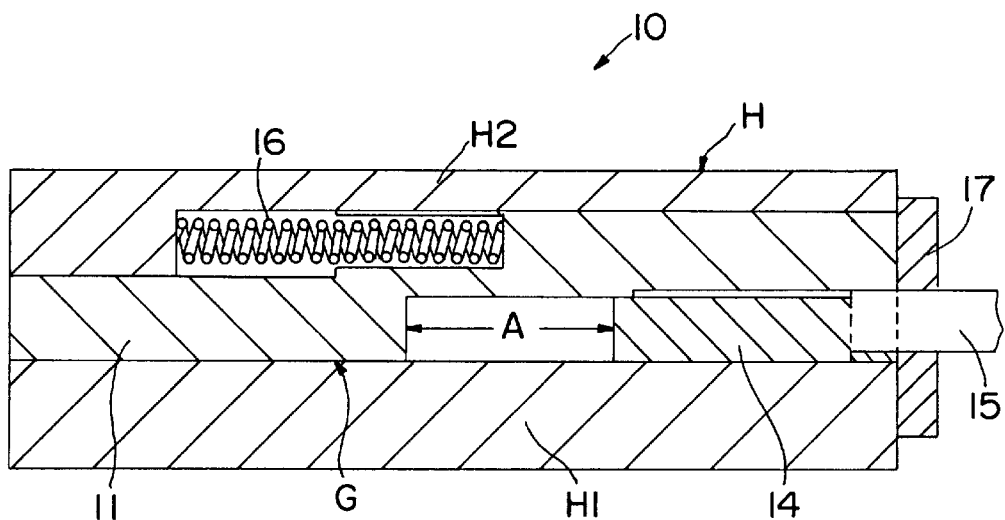
FIG. 2 is a cross-section of the self-centering steady along line II—II of FIG. 1.

Referring to FIGS. 1 and 2, the center gripping arm 11 is slidably received in a slide guide G defined between the base plate H1 and the cover plate H2 of the housing H. The center gripping arm 11 is held against a stop element 17 by means of a coiled compression spring 16, which is preloaded and placed between the cover plate H2 of the housing H of the self-centering steady 10 and the center gripping arm 11. When the gripping arms are retracted inside the housing of the self-centering steady 10, the actuator 14 and the center gripping arm 11 are separated by a gap A.

Figure 3:
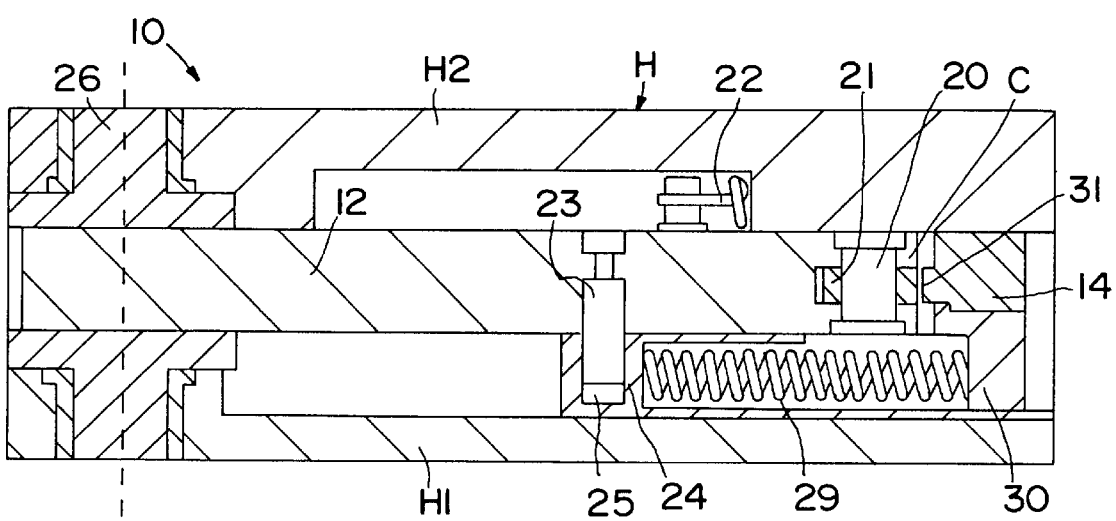
FIG. 3 is a cross-section of the self-centering steady along line III—III of FIG. 1.

Referring to FIGS. 1 and 3, the side gripping arm 12 is provided with two shoulders 18 and 19 and has a forked end C with a pin 20 carrying a roller 21. Moreover the side gripping arm 12 is connected to the actuator 14 by a coiled extension spring 22 and is provided with a connecting pin 23 which connects it to a slide 24. A recess 25 is provided for engaging the pin 23. The side gripping arm 12 is guided by a rotating element 26 in which it is slidably received. The rotating element 26 is positioned at the end of the housing H from which the gripping arms 11, 12 and 13 extend and rotates about its center line and is provided with abutment edges 27 and 28 for the shoulders 18 and 19, respectively, of the side gripping arm 12. A coiled compression spring 29 has enough preload to balance the static frictional resistance of the side gripping arm 12 and is placed within the slide 24. A block 30, which is fastened to the actuator 14, pushes one end of coiled compression spring 29 while the other end thereof presses against the housing of the slide 24.

Referring again to FIGS. 1 and 3, the actuator 14 is provided with lateral cam surfaces 31 and 32, the curvature of which is not constant and is determined so as to make the steady self-centering. When the side gripping arm 12 is retracted inside of the housing of the self-centering steady 10, a small gap B is formed between the lateral cam surfaces 31, 32 and the roller 21.

OPERATION OF THE FIRST EMBODIMENT

According to the present invention, the center gripping arm 11 moves out of the housing H of the self-centering steady while the side gripping arms 12 and 13 undergo a translation movement followed by a rotational movement.
Extension and Workpiece Engagement Movements of the Gripping Arms The first step of movement of the side gripping arms 12, 13 of the self-centering steady 10 is an outward translation under the action of the actuator 14 which covers the gap A separating it from the center gripping arm 11, while the coiled compression spring 16 holds the center gripping arm 11 against the stop 17. Simultaneously, the block 30 causes forward movement of the slide 24 by acting on the coiled compression spring 29. The actuating force is transmitted to the side gripping arm 12 by means of the pin 23 which is fitted in the recess 25 of the slide 24, thereby causing the side gripping arm 12 to be translated. During the translation, the intervening gap B between the roller 21 and the lateral cam surface 31 of the actuator 14 remains unchanged.

Figure 4:
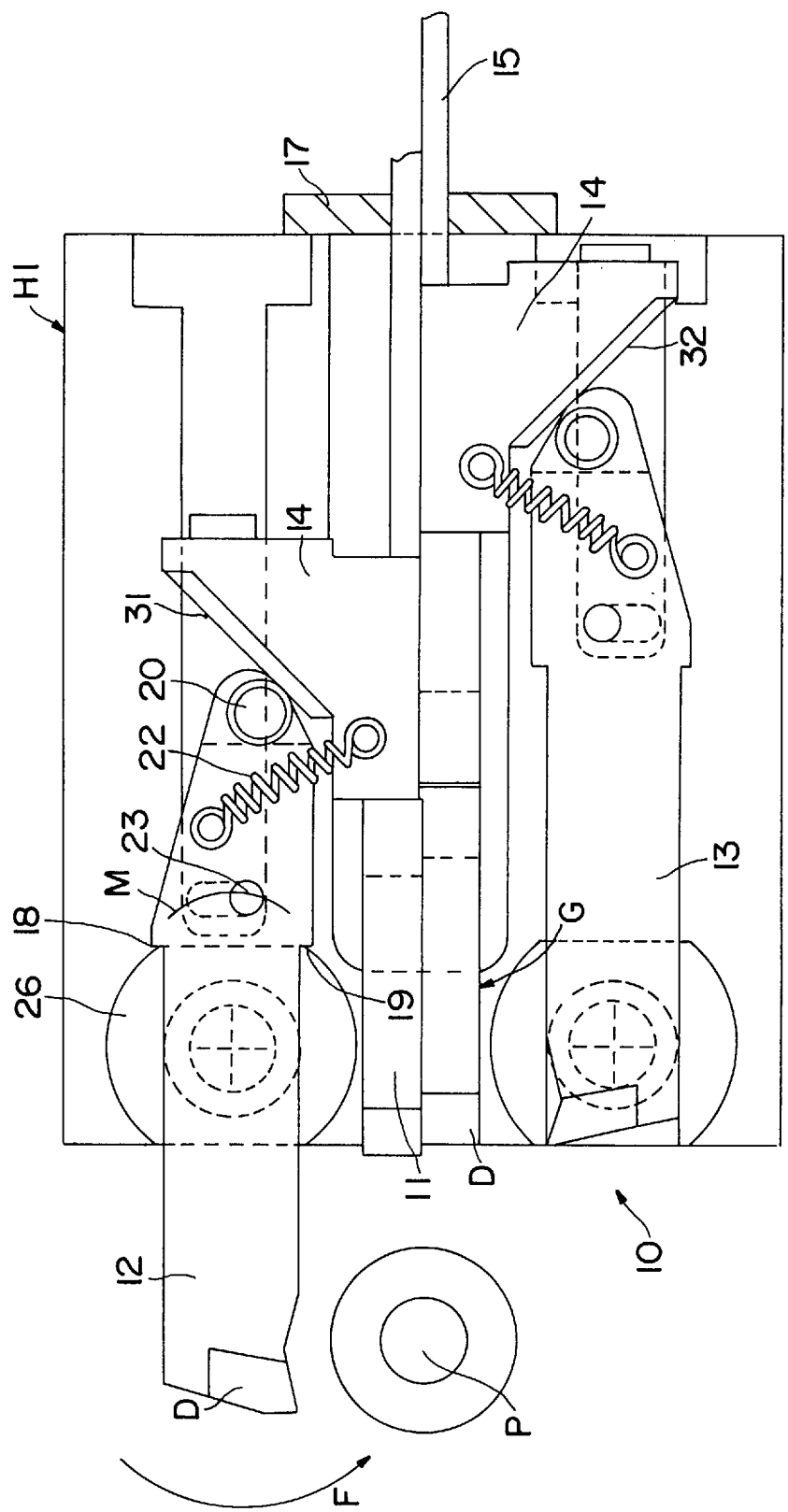
FIG. 4 is an elevational view of the internal structure of the self-centering steady of FIG. 1 showing the arrangement of its components in two different operative steps.
Figure 5:
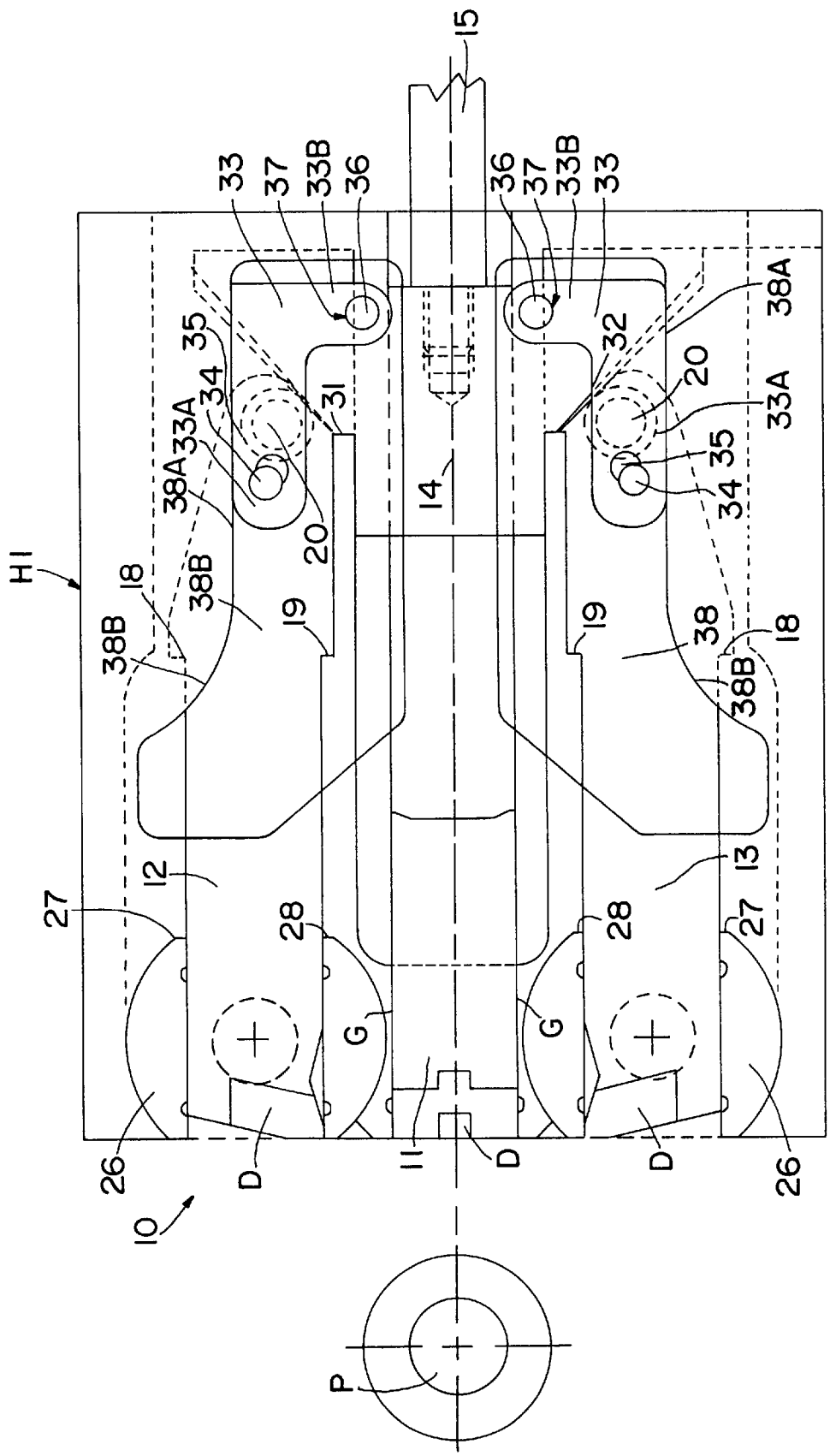
FIG. 5 is an elevational view of the internal structure of a second embodiment of the self-centering steady with its gripping arms in a withdrawn condition.

Referring to FIG. 4 of the drawings, the extension movement of the side gripping arms 12, 13 ends when their shoulders 18 and 19 strike against the abutment edges 27 and 28, respectively of the rotating element 26 of the self-centering steady 10.

The second step consists in a translation movement of the center gripping arm 11 while the side gripping arms 12 and 13 are stationary. During this movement the actuator 14 travels for a second length of its stroke covering the intervening gap B between the rollers 21 and the lateral cam surfaces 31 and 32 of the actuator 14. Meanwhile, the actuator 14 causes the center gripping arm 11 to be extended, thereby forcing the coiled compression spring 16 to be compressed.

During the third and last step the center gripping arm 11 continues to translate while the side gripping arms 12 and 13 rotate in order to grip the workpiece P.

During this step the actuator 14 terminates its stroke and the block 30, which is fastened to the actuator 14, causes the coiled compression spring 29 to be compressed while the rollers 21 of the two side gripping arms 12 and 13 roll on the lateral cam surfaces 31 and 32 of the actuator 14. The contour of the lateral cam surfaces 31 has a non-constant curvature in order to make the steady self-centering and to cause by rotation a workpiece engagement movement of the side gripping arms 12 and 13, thereby extending the extension spring 22. This rotation occurs in the direction of the arrow F in FIG. 4, and this rotation is made possible by the fact that the center line M of the recess 25 in which the connecting pin 23 engages, is a circle arc having its center at the center rotational axis of the rotating element 26. The forward movement of the actuator 14 also causes further extension of the center gripping arm 11, and therefore a greater compression of the compression spring 16. At this point all the gripping arms 11, 12 and 13 support and center the workpiece P. The side arms 12 and 13 exert forces on the workpiece P whose inwardly directed components, which are parallel to the longitudinal axis of the steady 10, balance the outwardly directed force exerted by the center gripping arm 11.

Workpiece Disengagement and Retraction Movements of the Gripping Arms

The first step of the workpiece disengagement movement consists in a rotation of the side arms 12 and 13 and a retraction of the center arm 11. In order to achieve this workpiece disengagement movement the actuator 14 travels a first length of its return stroke during which the compression spring 16 is partially unloaded, thereby exerting on the center gripping arm 11 the force necessary to cause its retraction. Simultaneously, the extension springs 22 are also unloaded, thereby causing the rollers 21 to roll on the lateral cam surfaces 31, 32 of the actuator 14 and the side gripping arms 12, 13 to rotate and in so doing, the force of the compression springs 29, which are compressed during the preceding steps of the extension and workpiece engagement movements of the gripping arms, presses the shoulders 18 and 19 against the abutment edges 27 and 28 of the rotating elements 26, respectively.

During the second and last step of movement, all of the gripping arms 11, 12, 13 undergo a translation movement so that the actuator 14 terminates its return stroke thereby causing, through the extension springs 22, the retraction of the side gripping arms 12 and 13 and the slides 24 connected thereto by means of the pins 23. At the same time, the compression spring 16 urges the center gripping arm 11 thereby retracting it up to the stop 17.

Referring now to FIGS. 5 to 8, the second embodiment of the self-centering steady is illustrated. The second embodiment differs from the first embodiment of FIG. 1 and 4 in that there is no provision of spring means 16, 22, 29 for the workpiece disengagement movement and the retraction movement of all of the gripping arms 11, 12, 13. In FIGS. 5 to 8 similar parts of the embodiment of FIGS. 1 to 4 are given similar reference numerals.

The self-centering steady 10 of FIGS. 5 to 8 has the center gripping arm 11 fastened to the actuator 14 and the side gripping arms 12, 13 are pivotally connected to the actuator 14 by means of bracket elements 33 having two arms 33A, 33B at right angles to each other. The bracket arm 33A is pivotally connected to the side gripping arm 12 or 13 by means of a pin 34 received in an elongated hole 35 provided in the bracket arm 33A. The actuator 14 is pivotally connected to the bracket arm 33B by means of a pin 36 received in a hole 37 provided in the bracket arm 33B.

In this case, in the cover plate H2 of the housing H a pair of shaped guides 38 are machined so as to receive in a slidable relationship the bracket elements 33 and to guide them during the extension and retraction movements and the workpiece engagement and disengagement movements of the side gripping arms 12, 13.

More particularly, each of the machined guides 38 has a rectilinear path 38A and a curved path 38B, the former being intended to impart the extension and retraction rectilinear movements of the side gripping arms 12, 13 and the latter being intended to impart, in combination with the cam surfaces 31 of the actuator 14, the rotary movement of the side gripping arms which is necessary for engaging and disengaging the workpiece.

OPERATION OF THE SECOND EMBODIMENT

Also in this embodiment the center gripping arm 11 moves in and out of the housing H of the self-centering steady while the side gripping arms 12 and 13 undergo a translation movement followed by a rotational movement.
Extension and Workpiece Engagement Movements of the Gripping Arms As previously stated, in this embodiment the spring elements 16, 22, 29 are not provided and the center gripping arm 11 is fastened to the actuator 14.

Figure 6:
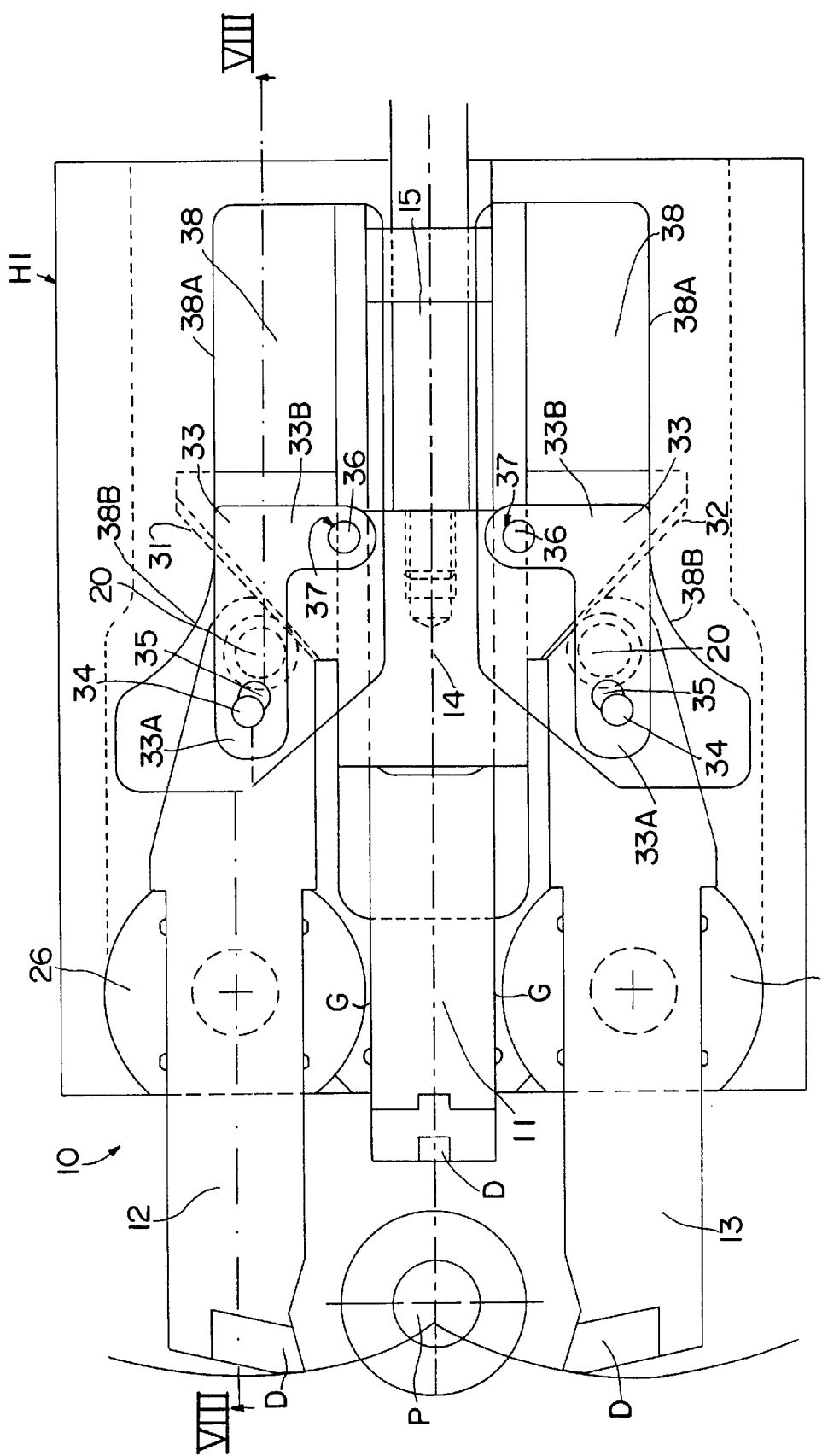
FIG. 6 is a view similar to FIG. 5 with the gripping arms in an extended condition.

The outward translation movement of the gripping arms 11, 12, 13 is obtained under the action of the actuator 14 which pushes all the gripping arms 11, 12, 13 in the extended condition of FIG. 6. In so doing, the bracket elements 33 connecting the actuator 14 to the side gripping arms 12, 13 slide along the rectilinear path 38A of the machined guide 38 until the shoulders 18 and 19 of the side gripping arms 12,13 strike against the abutment edges 27 and 28, respectively of the rotating element 26 of the self-centering steady 10.

Figure 7:
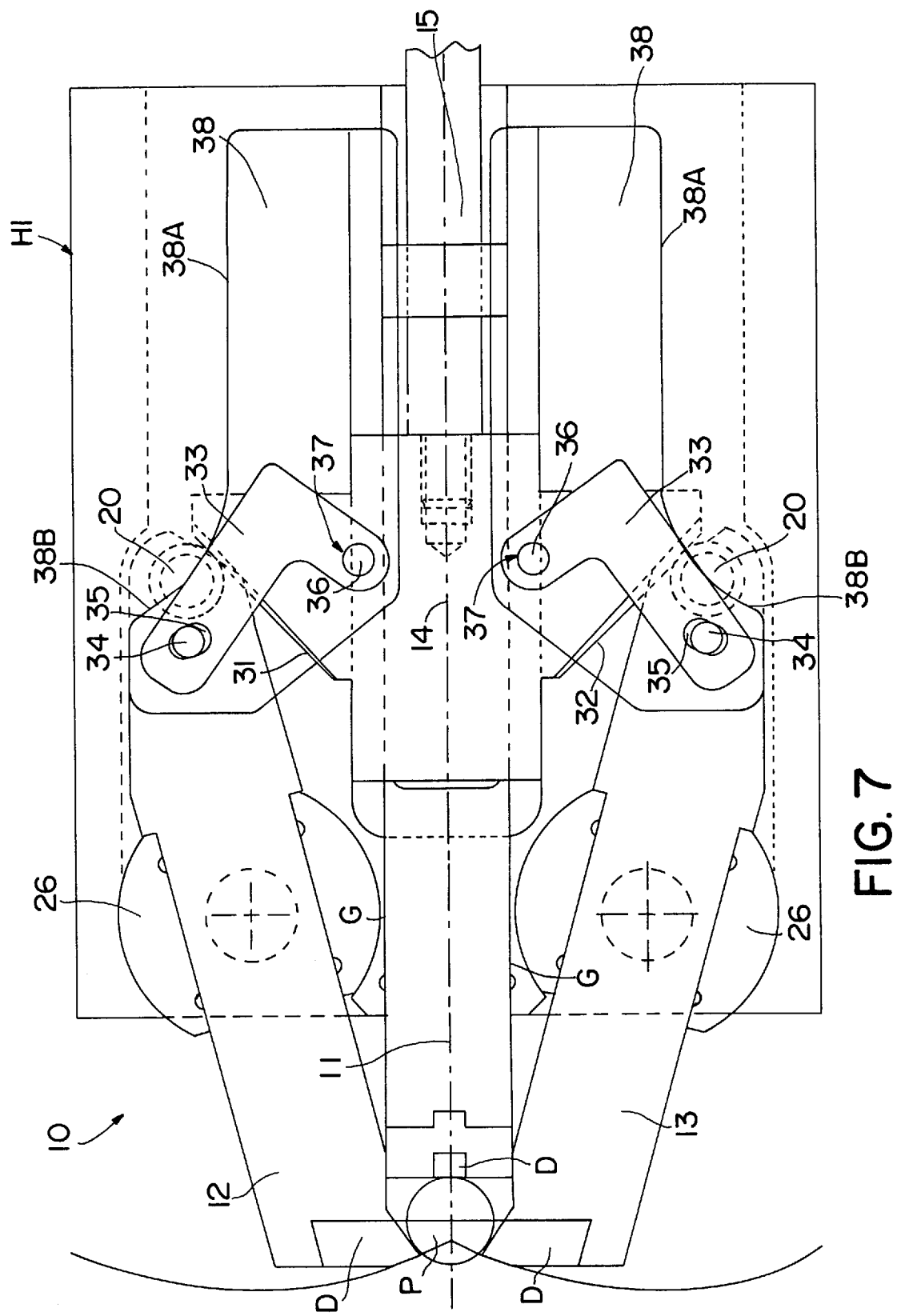
FIG. 7 is a view similar to FIG. 5 with the gripping arms in engagement with a workpiece.
Figure 8:
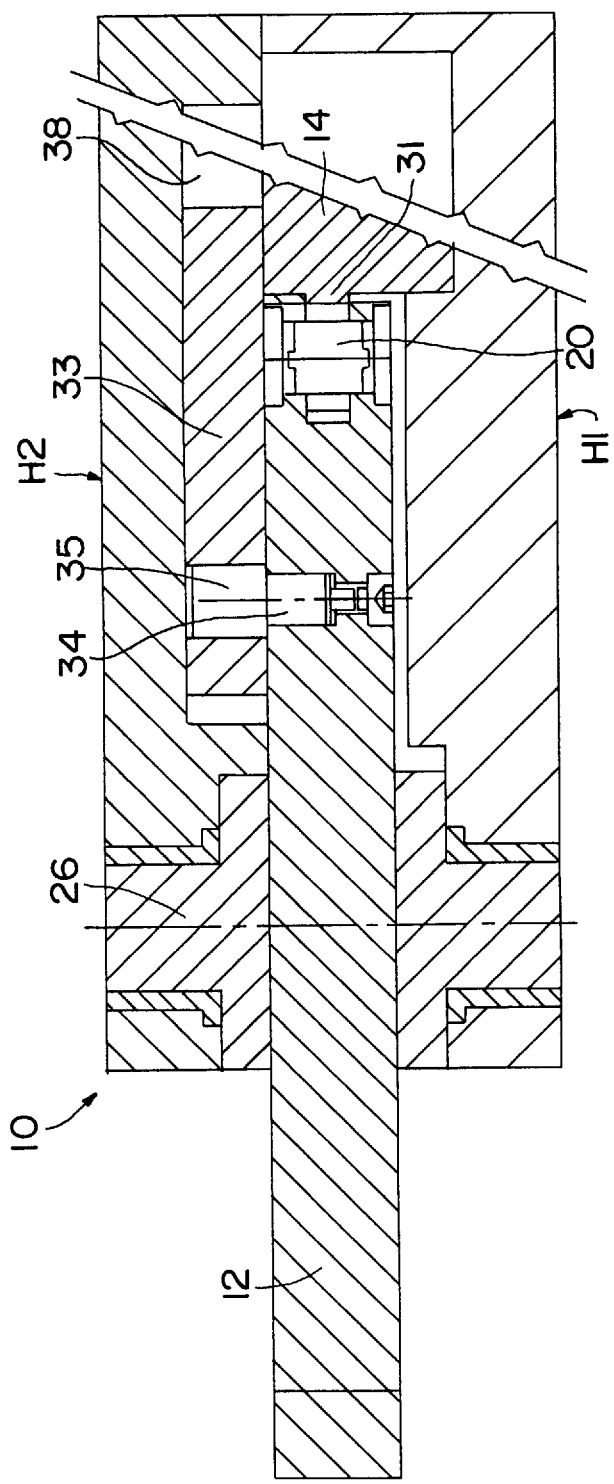
FIG. 8 is a cross-sectional view along the line VIII—VIII of FIG. 6.

During the second step of movement, the center gripping arm 11 continues to translate while the side gripping arms 12 and 13 rotate in the rotating elements 26 in order to engage the workpiece P, as shown in FIG. 7. During this movement the rollers 21 of the two side gripping arms 12 and 13 roll on the lateral cam surfaces 31 and 32 of the actuator 14, while the bracket elements 33 are travelling along the curved path 38B of the guide 38.
Workpiece Disengagement and Retraction Movements of the Gripping Arms In this case, since no spring means are provided for the workpiece disengagement and retraction movements, the actuator 14, being fastened to the center gripping arm 11 and pivotally connected to the side gripping arms 12, 13 by means of the bracket elements 33, provides the force for the above movements.

During the workpiece disengagement movement, the center gripping arm will be retracted by the actuator 14 while the side gripping arms 12, 13 will disengage from the workpiece P. This disengagement movement is caused by the bracket elements 33 when they slide along the curved path 38B of the guide 38 which causes a rotational movement of the side gripping arms 12, 13 together with the rotating elements 26.

During the second step of movement, all of the gripping arms 11, 12, 13 undergo a translation movement by being pulled by the actuator 14 until they are completely withdrawn in the steady housing H. During this movement the bracket elements 33, connecting the side gripping arms 12, 13 to the actuator 14, slide in the straight path 38A of the guide 38.

Advantageously, both the embodiments of the self-centering steady according to the invention maintain the alignment between the rotational center of the chuck of a lathe and the geometrical center of the workpiece even if the latter is changed. The alignment is maintained with reduced deviations and furthermore permits workpieces having the same diameter to be repositioned with very small deviation values thereby permitting very high quality levels to be achieved.

As can be understood from the above description, the provision of the rotating elements 26 slidably receiving the side gripping arms 12 and 13 in combination with the slide guide G slidably receiving the center gripping arm 11 arranged in a close relationship so as to eliminate any free space therebetween, will prevent dust and scraps from entering into the housing H and this is the case with the gripping arms both in the retracted and extended positions.

Furthermore, the self-centering steady according to this invention has a very compact construction, so that it cannot interfere with other parts of the machine tool or lathe on which it is mounted.

What is claimed is:

1. A self-centering steady comprising:
   a housing including a slide guide;
   a pair of rotating elements provided in said housing adjacent a first end thereof;
   a center gripping arm slidably received in said slide guide so as to be movable in and out of said first end of said housing between a retracted position and an extended position;
   a pair of side gripping arms for gripping a workpiece, said side gripping arms being slidably received in said rotating elements, respectively;
   an actuator indirectly connected to said side gripping arms and having first and second cam surfaces for imparting a workpiece engagement movement and a workpiece disengagement movement to said side gripping arms, said actuator being disposed so as to be directly engageable with said center arm, wherein:
      said side gripping arms are rectilinearly movable in and out of said housing;

said side gripping arms are rotatable during the workpiece engagement and disengagement movements; and said rotating elements, said side gripping arms, said center gripping arm, and said housing form a closed structure which is capable of preventing dust and scraps from entering said housing when said gripping arms are in an extended position or in a retracted position relative to said housing.

2. A self-centering steady as claimed in claim 1, wherein said rotating elements are provided with abutment edges for cooperating with stops provided on each of said side gripping arms in order to stop rectilinear movement of said side gripping arms and start rotational movement of said side gripping arms due to engagement of said cam surfaces of said actuator with said side gripping arms.

3. A self-centering steady as claimed in claim 1, further comprising spring means for effecting workpiece engagement and retraction of said center gripping arm and said side gripping arms, said spring means being loaded during workpiece engagement movement of said center gripping arm and said side gripping arms.

4. A self-centering steady as claimed in claim 1, wherein said housing comprises a base plate and a cover plate, and said base plate and said cover plate, in combination, define said slide guide.

5. A self-centering steady as claimed in claim 1, further comprising a pair of bracket elements pivotally connecting said side gripping arms, respectively, to said actuator.

6. A self-centering steady as claimed in claim 5, wherein each of said bracket elements comprises:

a first arm provided with a first hole for receiving a first pin so as to connect said bracket element to one of said side gripping arms; and a second arm provided with a second hole for receiving a second pin so as to connect said bracket element to said actuator, said second arm projecting at a right angle relative to said first arm.

7. A self-centering steady as claimed in claim 5, further comprising shaped guides for slidably receiving said bracket elements, wherein said housing includes a base plate and a cover plate, and each of said shaped guides is machined in said cover plate of said housing and includes a straight portion and a curved portion, said straight portion is capable of transmitting to said gripping arms rectilinear extension and retraction movements imparted by said actuator, and said curved portion is capable of transmitting, to said side gripping arms, the workpiece engagement and disengagement movements imparted by said cam surfaces of said actuator.

\* \* \* \* \*

UNITED STATES PATENT AND TRADEMARK OFFICE
CERTIFICATE OF CORRECTION

PATENT NO. :   5,860,341
DATED      :   January 19, 1999
INVENTOR(S) :  Bruno VISIGALLI It is certified that error appears in the above-indentified patent and that said Letters Patent is hereby corrected as shown below:

Column 1, Line 16, change "1200" to --120°--.

Signed and Sealed this

Thirty-first Day of August, 1999

Attest:

Q. TODD DICKINSON

Attesting Officer        Acting Commissioner of Patents and Trademarks